(12) United States Patent
Funk et al.

(10) Patent No.: US 6,443,008 B1
(45) Date of Patent: Sep. 3, 2002

(54) DECOUPLED MULTI-DISK GYROSCOPE

(75) Inventors: Karsten Funk, Mountain View; Markus Lutz, Sunnyvale; Wilhelm Frey, Mountain View, all of CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/507,583

(22) Filed: Feb. 19, 2000

(51) Int. Cl.$^7$ ................................................. G01P 9/04
(52) U.S. Cl. ................................. 73/504.12; 73/504.04
(58) Field of Search ........................ 73/504.04, 504.12, 73/504.03, 514.29, 514.37, 514.38, 514.32, 862.59; 310/308, 309, 338

(56) References Cited

U.S. PATENT DOCUMENTS

| | | | |
|---|---|---|---|
| 5,359,893 A | * 11/1994 | Dunn | ....................... 73/504.12 |
| 5,635,640 A | * 6/1997 | Geen | ....................... 73/504.12 |
| 5,955,668 A | * 9/1999 | Hsu et al. | ................. 73/504.12 |
| 6,062,082 A | * 5/2000 | Guenther et al. | ........ 73/504.12 |
| 6,119,517 A | * 9/2000 | Breng et al. | ............. 73/504.12 |

* cited by examiner

Primary Examiner—Helen Kwok
(74) Attorney, Agent, or Firm—Kenyon & Kenyon (57) ABSTRACT

A gyroscope system including multiple rotating or oscillating disks filters out disturbance acceleration inputs such as vibrations or jarring while detecting and measuring external angular velocity. The gyroscope disks are decoupled from a substrate to decrease the impact of external vibrations on the gyroscope operation. The gyroscope disks are rotated in opposite directions or oscillated out of phase to decrease the impact of disturbance vibrations and jarring while more accurately measuring external angular velocities applied to the system.

20 Claims, 6 Drawing Sheets

DECOUPLED MULTI-DISK GYROSCOPE

BACKGROUND INFORMATION

The present invention relates to a gyroscope device. More specifically, a gyroscope device is provided that includes multiple disks and is adapted to detect angular velocities while filtering out vibrations and disturbances.

A vibrating gyroscope includes a mass moving in a rotating oscillation around an axis, or oscillating in a linear direction, in a "primary motion." An angular velocity applied to the gyroscope about an axis perpendicular to the axis of primary motion (rotation or oscillation) causes the gyroscope to rotate (or oscillate) in a secondary motion about a third axis (or in a second direction) perpendicular to the primary motion axis (or direction) and perpendicular to the axis of the applied angular velocity. Gyroscopes are used for detecting angular velocities in applications from airplane navigation systems to dynamic control systems to automobile safety systems, and many others.

Because gyroscopes measure an external angular velocity applied around one axis via the displacement of the gyroscope around a perpendicular secondary motion axis, the gyroscope systems are susceptible to external vibrations and displacements that also cause disturbance motions around the secondary motion axis.

In general, gyroscopes have been constructed with large electromagnetic devices. Recently, however, micromachined gyroscopes have been developed as part of micro-electro-mechanical systems. Using similar technologies to those used to manufacture semiconductors, microscopic gyroscopes are fabricated on silicon wafers. These technologies may include oxidation of a substrate, application of a photoresist material, selective exposure to light or x-rays through a mask, and etching to build devices in layers on a substrate. An example of such a micro-electro-mechanical gyroscope device is described in PCT Patent Publication No. WO 97/45699. This is a one-layer device employing a single oscillating mass in the gyroscope.

Another example of a micro-machined gyroscope device is described in U.S. Pat. No. 5,635,640 to Geen (the "Geen patent"). This is a one-layer device (that is, one layer of components, not counting a layer of substrate). This patent describes a gyroscope with two oscillating masses joined by a spring and driven by a "comb drive." Such one-layer devices are not isolated or decoupled from the substrate and are therefore susceptible to external vibrations and motions, which may cause noise or failure signals in the gyroscope's signal by displacing the gyroscope along the secondary motion axis, even when a secondary motion is not induced by an angular velocity applied around the sensitive axis. Furthermore, since the gyroscope is not isolated from the substrate, momentum from the gyroscope or the spring may be transmitted to the substrate and vice versa. A gyroscope adapted to filter out internal and external "noise" forces and momentums and isolated from the substrate overcomes limitations of current gyroscopes.

SUMMARY OF THE INVENTION

A gyroscope system is provided comprising at least two disks adapted for motion about a first axis, and a fixed support clamp connected to a substrate. The disks are decoupled from the substrate, and the disks are set in motion about the first axis in a manner that the motion of the first disk is out of phase with the motion of the second disk.

DETAILED DESCRIPTION

Figure 1:
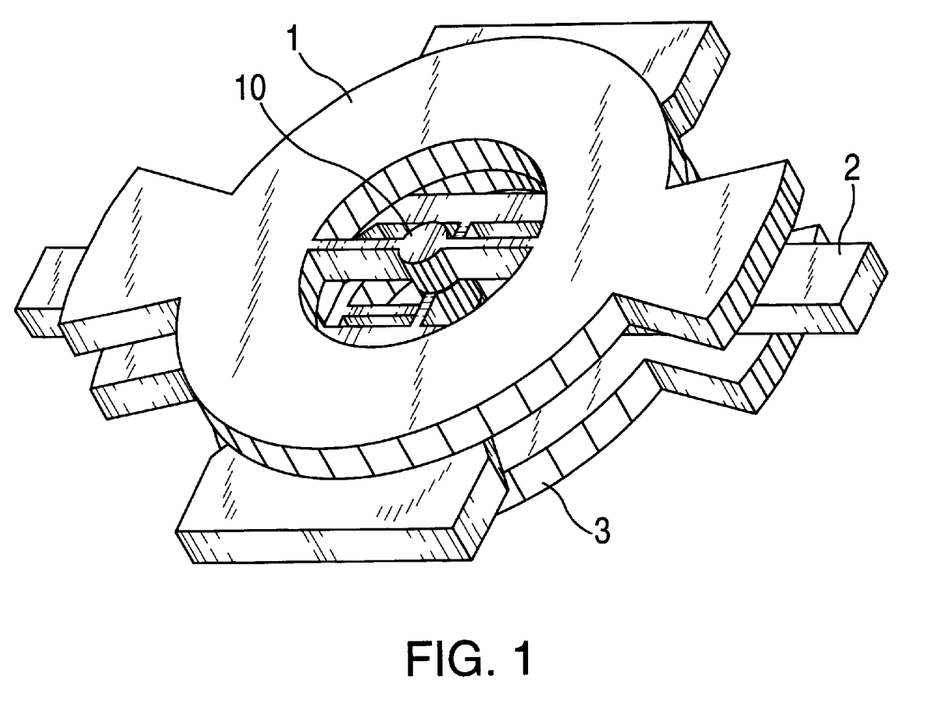
FIG. 1 shows a two-disk gyroscope system, according to an embodiment of the invention.

FIG. 1 shows a decoupled multi-layer gyroscope system, according to an embodiment of the present invention. In the example shown in FIG. 1, the gyroscope system comprises three layers including an upper disk 1, a fixed support clamp 2, and a lower disk 3. The fixed support clamp 2 is fixed, for example, to a substrate (not shown). The upper and lower disks 1, 3 are connected to a connecting structure. In the embodiment shown in FIG. 1, the connecting structure is a center cylinder 10 that serves as an interconnection between all three layers 1, 2, 3.

Figure 2:
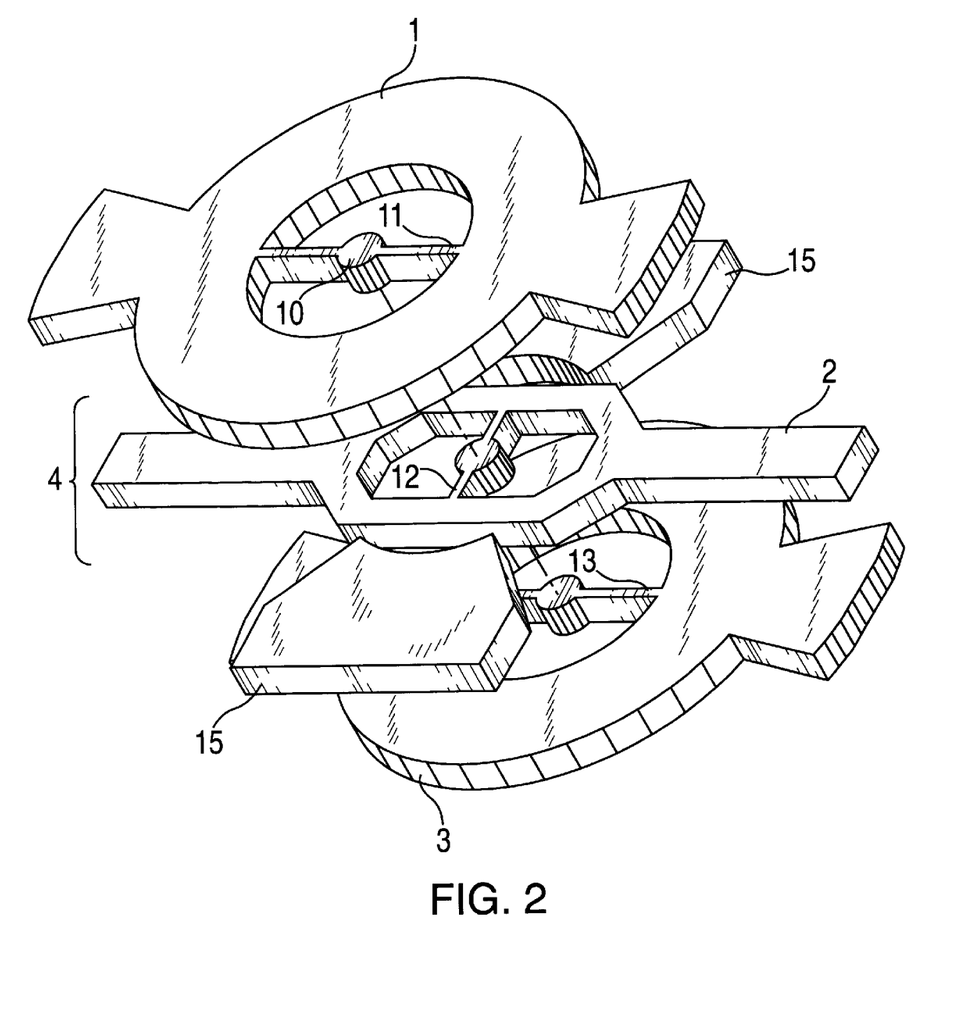
FIG. 2 shows an exploded view of a two-disk gyroscope system, according to an embodiment of the invention.

The system of FIG. 1 is shown in an exploded view, for clarity, in FIG. 2. The connecting structure, for example a center cylinder 10, is shown exploded into layers corresponding to the disks 1, 3 and support clamp 2, although the cylinder may actually be comprised of a continuous structure connecting the three layers. Each layer is connected to the connecting structure, for example a center cylinder 10, via springs. The upper and lower disks 1, 3 are connected to the center cylinder via upper and lower springs 11, 13. The center cylinder is connected to the fixed support clamp 2, via a support spring 12. In this manner, the gyroscope system may be isolated or decoupled from the fixed substrate supporting it.

The gyroscope system of FIG. 2 is adapted for oscillation about a primary motion axis along the center of the center cylinder 10. In another embodiment of the invention, the gyroscope system is adapted for rotation of the disks about a primary motion axis. In this case, the disks may be attached to a center cylinder 10 via, for example, mechanical bearings. In another embodiment, instead of using a center cylinder 10 to support the disks, another structure may be used such as, for example, individual bearings for each disk that are each attached to the substrate in a manner that keeps the disks decoupled from the substrate (e.g., via springs).

Figure 3A:
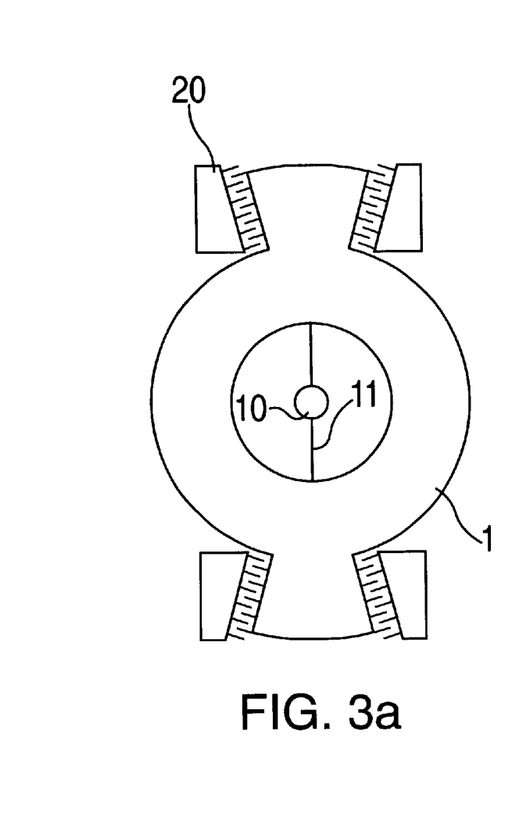
FIG. 3a shows a top view of an upper gyroscope disk, according to an embodiment of the invention.
Figure 3B:
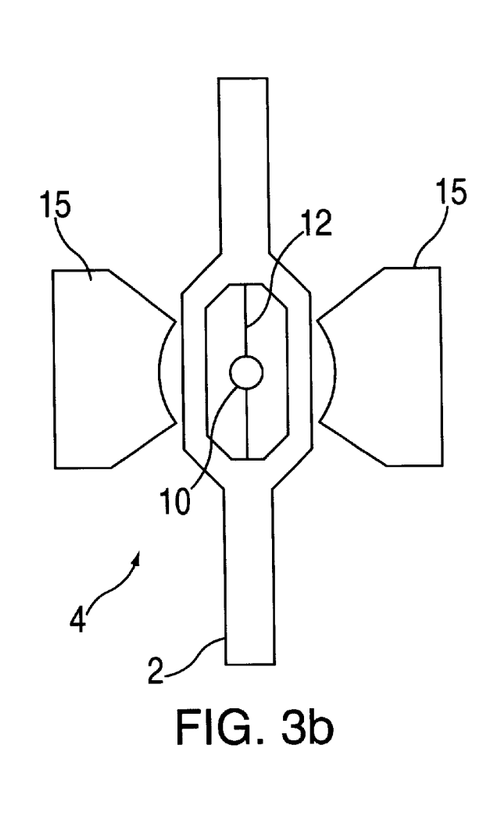
FIG. 3b shows a top view of a middle layer of a gyroscope system, according to an embodiment of the invention.
Figure 3C:
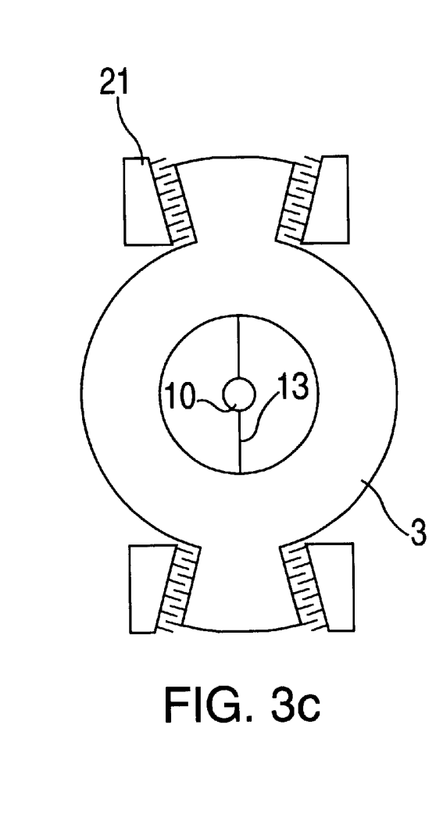
FIG. 3c shows a top view of a lower gyroscope disk, according to an embodiment of the invention.

FIGS. 3a–c show top views of each of the layers shown in FIG. 2. FIG. 3a shows the upper disk 1, including a comb drive 20 for causing the disk to oscillate about a primary motion axis through the connecting structure, for example a center cylinder 10. The comb drive 20 may be a drive such as, for example, the "dither drive comb" described in the Geen patent. FIG. 3c shows the lower disk, also including a comb drive 21. Although comb drives are shown for oscillating the disks, it is to be understood that other mechanisms may be used to rotate or oscillate the disks such as electrodynamic drives, a magnetic field, piezoelectric forces, thermo-optics, or a direct mechanical input such as a motor or spring.

FIG. 3b shows a fixed middle layer 4, including a fixed support clamp 2, which is attached to a fixed substrate (located, for example, below the lower disk 13), to which the gyroscope system is ultimately attached. The connecting structure, for example a center cylinder 10, is attached to the support clamp 2 via a support spring 12. Also included in the fixed middle layer 4 are movement sensors 15 for measuring movement of the disks in response to angular velocity inputs.

Figure 4:
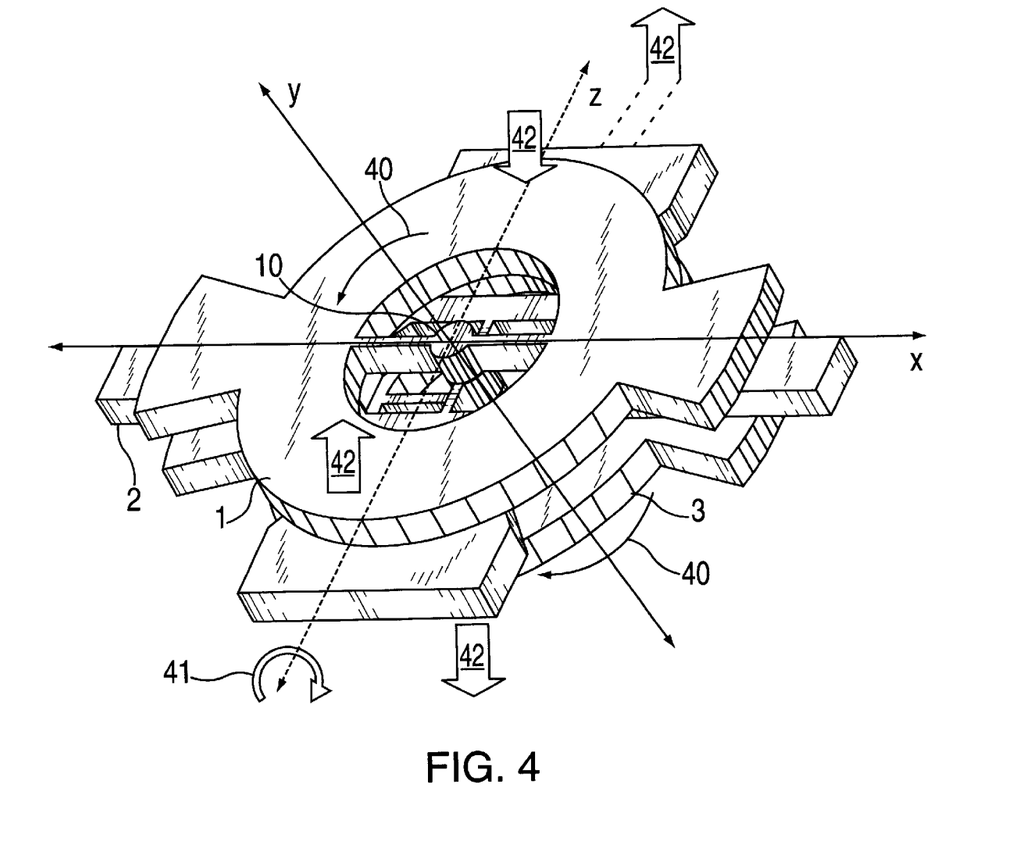
FIG. 4 shows the two-disk gyroscope system of FIG. 1 with the movements and velocities applied when the gyroscope system is operating.

FIG. 4 demonstrates the manner of operation of a gyroscope system, according to an embodiment of the invention. The gyroscope system is shown with three dimensional axes labeled x, y, and z in order to better explain the operation of the system. The upper and lower disks 1, 3 are oscillated (for example using a comb drive) in opposite directions around they axis. The y axis shown in FIG. 4 is also known as the primary motion axis. The disks may each be designed for oscillation in any range. For example, a range of ±1.5–2.5 degrees may be used for a micro-electro-mechanical gyroscope system. The upper and lower disks 1, 3 may be oscillated 180 degrees out of phase. This out of phase oscillation is shown by the direction of rotation arrows 40, which show the direction of rotation of the disks 1, 3 at a particular instant in time. When an external angular acceleration (shown as arrow 41) is applied to the gyroscope system about the z axis (also known as the sensitive axis), the resulting Coriolis force induces movement in the gyroscope disks 1, 3, about a third perpendicular axis (the x axis, also known as the detection axis, or the secondary motion axis).

As shown in FIG. 4, a clockwise external angular velocity applied to the gyroscope system about the sensitive axis causes a secondary motion in the disks about the secondary motion axis. In this case, a clockwise rotation about the secondary motion axis is induced in the upper disk and a counter-clockwise rotation in the lower disk. This is demonstrated by the movement arrows 42 showing the forward edge of the upper disk moving up and the rear edge of the upper disk moving down. Conversely, the lower disk, which is rotating in an opposite direction, moves in an opposite direction with the forward edge of the lower disk moving down, and the rear edge of the lower disk moving up, as shown by the arrows 43. In the case of an oscillating gyroscope, this description of secondary motion is for an instantaneous moment in time. The secondary motion in this case will be an oscillation about the secondary motion axis, with the upper and lower disks 11, 13 oscillating out of phase.

Movement sensors 15 positioned, for example, in the middle layer 4 along the sensitive axis are adapted to detect changes in distance between the disks 1, 3 and the substrate layer 4. In one embodiment of the invention, the movement sensors 15 are detection electrodes adapted to detect changes in capacitance between the disks 1, 3 and the middle layer 4. The movement sensors 15 may be of the type, for example, described in the Geen Patent.

The movement of the disks in opposite directions in response to an external angular velocity doubles the change in capacitance detected by the detection electrode movement sensors 15 over what would be detected if there were only one disk present, as in prior art systems. In other embodiments of the invention, the movement sensors could comprise a laser or other optical measuring system, a piezoresistive measuring system, or any other type of system for detecting secondary motion of the disks. Although the example of movement sensors comprised of detection electrodes for sensing capacitance is used throughout this description, it is to be understood that any type of movement sensor could be implemented, within the scope of the invention.

Figure 5A:
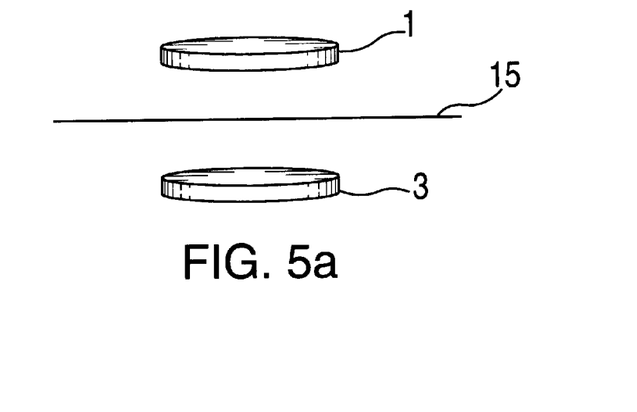
FIG. 5a shows a conceptual diagram of a two-disk gyroscope system, where there is no external force or velocity applied, according to an embodiment of the invention.
Figure 5B:
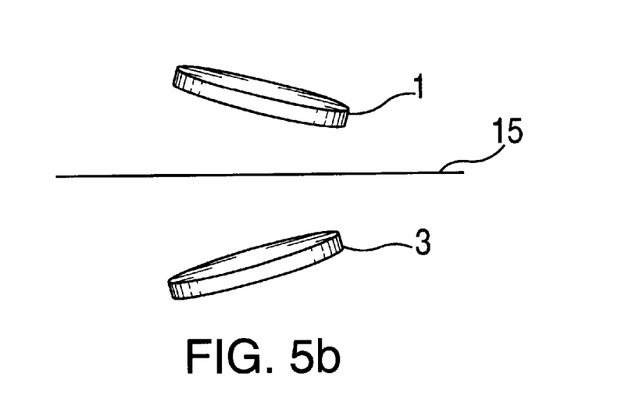
FIG. 5b shows a conceptual diagram of a two-disk gyroscope system, where an external velocity is applied about a sensitive axis, according to an embodiment of the invention.
Figure 5C:
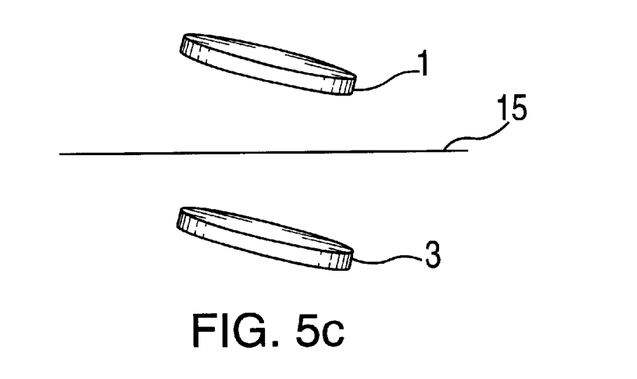
FIG. 5c shows a conceptual diagram of a two-disk gyroscope system, where an external disturbance acceleration is applied, according to an embodiment of the invention.

FIGS. 5a, 5b, and 5c illustrate the different conditions and responses to acceleration or momentum inputs to the gyroscope system shown in FIG. 4. FIG. 5a shows the steady-state position of the upper and lower disks 1, 3 when there is no external angular acceleration or velocity operating on the gyroscope (other than the drive torque driving the disks to oscillate or rotate about the primary motion axis and the force of gravity). The external angular velocity represented by the arrow 41 in FIG. 4 causes the disks to move as represented in FIG. 5b, with one edge of the upper disk moving up and the corresponding edge of the lower disk moving down.

As can be seen clearly from FIG. 5b, the distance between the disks 1, 3 and the movement sensors 15 is changed by the response of the rotating or oscillating disks to an external angular velocity. Since the capacitance between a disk 1, 3 and an electrode 15 is inversely proportional to the distance between them, this movement alters the capacitance. Therefore, by rotating or oscillating the upper and lower disks in opposite directions, the resulting capacitance change is greater than what the change would be with only one disk, so the detection capacitance signal is therefore stronger, and the gyroscope system is more sensitive to external angular velocities.

As shown in FIG. 5c, an external movement of the gyroscope system around the secondary motion axis (for example, a vibration or jarring of the system) will cause both disks to move in the same direction, even though they are rotating or oscillating in opposite directions. Since two disks 1, 3 are present, and they move in the same direction in response to such an external disturbance, the total capacitance between the two disks and the electrodes 14 remains nearly unchanged. For example, in FIG. 5c, the right-hand side of the upper disk moves downward, thus increasing the capacitance between the upper disk and the substrate layer. The right-hand edge of the lower disk, however, also moves down in response to this acceleration, and the capacitance decreases. The total capacitance, therefore, between the right edges of the two disks 1, 3, is nearly unchanged. In this manner, external disturbing accelerations such as vibrations and jarring accelerations are filtered out, and thus not detected, while external angular velocities are detected.

In one embodiment, the disks 1, 3 are maintained decoupled from the substrate by connection to a connecting structure, for example a center cylinder 10, via springs 11, 13, and further connection of the center cylinder 10 to a fixed clamp 2 via a support spring 12. The fixed clamp 2 is fixed to a substrate (not shown), which is, for example, a fixed structure located below the lower disk 3. In the case of a micro-electromechanical device, the substrate may be comprised of, for example, a silicon wafer.

By constructing the springs 11, 13 with approximately equivalent spring constants and oscillating the disks out of phase, the disks will not induce a rotation in the center cylinder 10, because the torque applied by each disk (via its spring 11, 13) is approximately the same. Furthermore, the secondary motion of the disks 1, 3 resulting from an external velocity applied to the gyroscope system, does not create an unbalanced force on the connecting structure. Since the secondary movement of the disks 1, 3 is in opposite directions, the springs 11, 13 flex in opposite directions. If the spring constants are approximately equivalent, the forces on the center cylinder 10 are balanced, and the support spring 12 linking the center cylinder 10 to the fixed support clamp 2 is not flexed.

In one embodiment of the invention, the spring 12 connecting the connecting structure, for example a center cylinder 10, to the fixed support clamp 2 is designed in a way that it could be deflected in the same direction as the springs 11, 13 when an external acceleration causes a movement such as shown in FIG. 5c. The parallel motion thus leads to a lower total spring constant since the spring constant of support spring 12 and those of springs 11 and 13 respectively are configured in series. In this embodiment, for the case of an oscillating gyroscope, there is a frequency split for the two possible modes of motion about the secondary motion axis. External velocities, as described above, cause the secondary motion of the disks 1, 3 to be in opposite directions, as shown in FIG. 5b, causing only the springs 11, 13 to flex. Support spring 12 will not be deflected since the momentum of spring 11 equals out the momentum of spring 13.

Vibrations and other disturbance motions, on the other hand, cause both discs 1, 3 to move in the same direction, as shown in FIG. 5c. In this case, not only are the springs 11 and 13 flexed, but the support spring 12 is also flexed. Since, in this embodiment, the total spring constant is lower than the spring constant for either the upper spring 11 or the lower spring 13, the resulting spring constant is the serial spring constant of springs 11 and 12 or 13 and 12, which leads to a significantly lower spring constant compared to the spring constant for the secondary motion induced by an external velocity. A lower spring constant results in a lower resonant frequency for the vibration-induced disturbance motion compared to the velocity-induced motion in which the discs are moving 180 degrees out of phase.

By disposing the support spring 12 along an axis parallel to the upper and lower springs 11, 13, and constructing the support spring 12 with a smaller spring constant, the support spring 12 provides a different resonant frequency for disturbance motions than for the motion of the disks 11, 13 that the gyroscope system is attempting to measure. In this manner, a mechanical filtering can be used to detect only secondary motion due to external velocity inputs, and to filter out vibrations and disturbances due to other forces. This increases the robustness of the system.

Figure 6A:
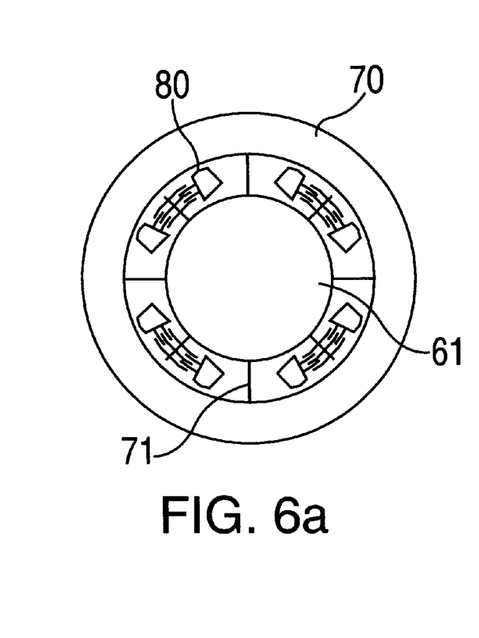
FIG. 6a shows a top view of an upper gyroscope disk, according to an embodiment of the invention.
Figure 6B:
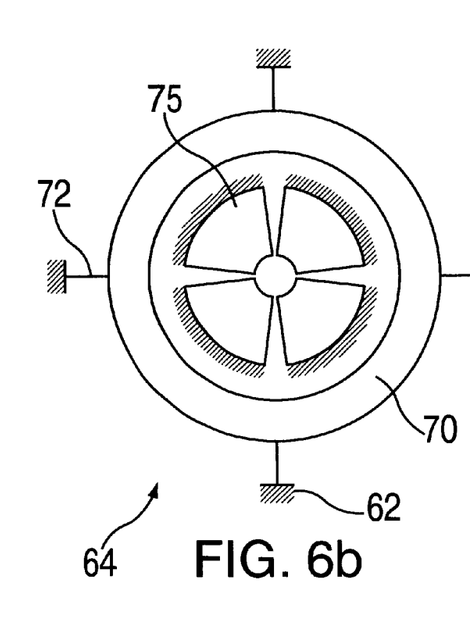
FIG. 6b shows a top view of a middle layer of a gyroscope system, according to an embodiment of the invention.
Figure 6C:
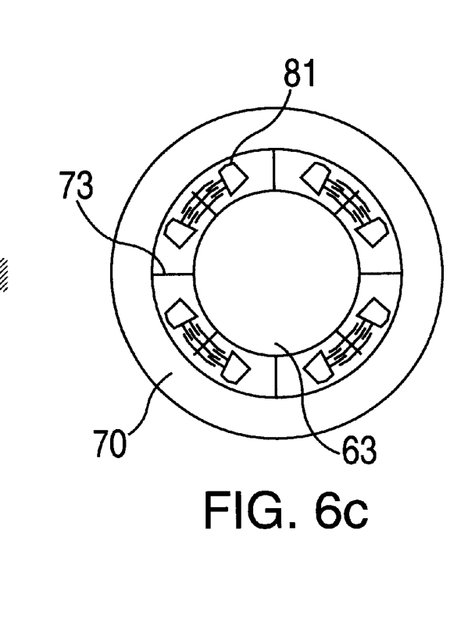
FIG. 6c shows a top view of a lower gyroscope disk, according to an embodiment of the invention.

FIGS. 6a, 6b, and 6c show another embodiment of a decoupled gyroscope system according to the invention. In this system, rather than employing a center cylinder as a connecting structure between the layers of the gyroscope system, the system uses an outer tube 70 as a connecting structure. In this embodiment, the connecting structure surrounds the disks and motion detectors 75, which are located in the center of the outer tube 70, as shown in FIGS. 6a–c. The upper disk 61, shown in FIG. 6a, may be actuated by a comb drive 80 disposed, for example, circumferencially around the outside of the upper disk 61. In this embodiment, the upper springs 71 may be attached to the outer circumferencial edge of the disk. These springs 71 attach the upper disk 61 to the connecting structure.

FIG. 6b shows the middle layer 64 of this embodiment of the invention. The connecting structure, for example, an outer tube 70, may be connected to a fixed support clamp 62 (shown conceptually in FIG. 6b) via an outer spring 72. The fixed support clamp 62 is connected to a fixed substrate (not shown), and the gyroscope system is decoupled from the substrate via the support springs 72, the connecting structure (e.g., an outer tube 70), and the upper and lower springs 71, 73. The movement sensors 75 are, for example, detection electrodes as described above.

FIG. 6c shows the lower layer of an embodiment of the invention. The connecting structure, for example an outer tube 70, is connected to a lower disk 63 via lower springs 73. A comb drive 81 is adapted to actuate the lower disk 63. In this manner, a multi-disk decoupled gyroscope may be implemented using an outer tube 70 as a connecting structure.

Although a particular embodiment of the invention has been described, it is to be understood that the scope of the invention, as defined in the claims, is broader than this exemplary application. For example, although upper and lower disks are described, it is to be understood that the gyroscope system of the present invention may be oriented in any manner such as side by side. As another example, the connecting structure may be implemented in any manner (in addition to the two embodiments described above), along with the springs or other devices for attaching the disks, to decouple the gyroscope from the fixed substrate. For example, the springs may be present in any number, or configured in any manner in relation to each other, such as in parallel, perpendicular, or in any other orientation, within the scope of the invention.

What is claimed is:

1. A gyroscope system comprising:
   a first disk adapted for motion about a first axis;
   a second disk adapted for motion about the first axis;
   a fixed support clamp connectable to a substrate;
   an arrangement to movably couple the first disk and the second disk to the fixed support clamp and to enable the first disk and the second disk to move about the first axis;
   wherein:
     when the first disk and the second disk are set in motion about the first axis, the motion of the first disk is out of phase with the motion of the second disk; and
     the first disk and the second disk are at least one of isolated and decoupled from the substrate when the fixed support clamp is connected to the substrate.

2. The gyroscope system of claim 1, further comprising a sensor adapted to sense movement of the disks about a second axis, wherein:
   the second axis is perpendicular to the first axis.

3. The gyroscope system of claim 2, wherein:
   the sensor is an electrode for sensing a change in capacitance due to movement of the disks about the second axis.

4. The gyroscope system of claim 1, wherein the arrangement includes:
   a first spring;
   a second spring;
   a third spring, and
   a connecting structure;
   wherein:
     the first spring connects the first disk to the connecting structure;

the second spring connects the second disk to the connecting structure; and the third spring connects the connecting structure to the fixed support clamp.

5. The gyroscope system of claim 4, wherein:

the connecting structure comprises a center cylinder.

6. The gyroscope system of claim 4, wherein:

the connecting structure comprises an outer tube.

7. The gyroscope system of claim 1, wherein:

the disks are implemented as micro-electromechanical components;

the fixed support clamp is implemented as a micro-electromechanical component; and the substrate is adapted to support micro-electromechanical components.

8. The gyroscope system of claim 7, further comprising:

a comb drive to induce motion of the disks about the first axis.

9. The gyroscope system of claim 7, further comprising:

a motor to induce motion of the disks about the first axis.

10. The gyroscope system of claim 7, wherein:

the motion of the first disk about the first axis is an oscillation motion; and the motion of the second disk about the first axis is an oscillation motion.

11. The gyroscope system of claim 1, wherein:

the motion of the first disk about the first axis is a rotation motion; and the motion of the second disk about the first axis is a rotation motion.

12. The gyroscope system of claim 1, wherein:

the first disk is positioned above the fixed support clamp; and the second disk is positioned below the fixed support clamp.

13. The gyroscope system of claim 4, wherein:

the first disk is coupled to the connecting structure with the first spring having a first spring constant;

the second disk is coupled to the connecting structure with the second spring having a second spring constant;

the connecting structure is coupled to the fixed support clamp with the third spring having a third spring constant.

14. The gyroscope system of claim 13, wherein:

the first spring constant is approximately equivalent to the second spring constant.

15. The gyroscope system of claim 2, further comprising:

means for filtering out movement of the disks about the second axis caused by a disturbance motion.

16. A gyroscope system comprising:

a first disk adapted for motion about a first axis;

a second disk adapted for motion about the first axis;

a connecting structure connected to the first disk and the second disk;

a fixed support clamp connected to the connecting structure and connectable to a substrate;

a first spring for connecting the first disk to the connecting structure;

a second spring for connecting the second disk to the connecting structure; and a third spring for connecting the connecting structure to the substrate, and a sensor adapted to sense a movement of the disks;

wherein:

when the first disk and the second disk are set in motion about the first axis, the motion of the first disk is out of phase with the motion of the second disk; and the first spring, the second spring, the third spring, and the connecting structure at least one of isolate and decouple the first disk and the second disk from the substrate.

17. The gyroscope system of claim 1, wherein the first disk and the second disk are aligned in the first axis.

18. The gyroscope system of claim 1, wherein the first disk and the second disk move in opposite directions with respect to one another in response to an external angular velocity, and the first disk and the second disk move in same directions with respect to one another in response to an external movement of the gyroscope system around a secondary motion axis.

19. The gyroscope system of claim 1, wherein the fixed support clamp includes an electrode arrangement for sensing a capacitance of the first disk and the second disk.

20. The gyroscope system of claim 1, wherein:

the first disk and the second disk are aligned in the first axis;

the first disk and the second disk move in opposite directions with respect to one another in response to an external angular velocity, and the first disk and the second disk move in same directions with respect to one another in response to an external movement of the gyroscope system around a secondary motion axis; and the fixed support clamp includes an electrode arrangement for sensing a capacitance of the first disk and the second disk.

* * * * *